United States Patent
Jamain et al.

[19]

[11] Patent Number: 5,804,899
[45] Date of Patent: Sep. 8, 1998

[54] MINIATURE MAGNETIC BEARING WITH AT LEAST ONE ACTIVE AXIS

[75] Inventors: Patrice Jamain, Maule; Christophe Bernus; Jean-Yves Frere, both of Paris; André Boura, Chatellerault; Rémi Delaplace, Mennecy, all of France

[73] Assignees: Aerospatiale Societe Nationale Industrielle, Paris; Sextant Avionique, Velizy Villacoublay, both of France

[21] Appl. No.: 626,448

[22] Filed: Apr. 2, 1996

[30] Foreign Application Priority Data

Apr. 7, 1995 [FR] France .................................. 95 04163

[51] Int. Cl.⁶ .................................................. H02K 7/09
[52] U.S. Cl. ............................................. 310/90.5
[58] Field of Search ..................... 310/90.5, 74

[56] References Cited

U.S. PATENT DOCUMENTS

| | | | |
|---|---|---|---|
| 3,614,181 | 10/1971 | Meeks .................................. | 310/90.5 |
| 3,955,858 | 5/1976 | Poubeau .............................. | 310/90.5 |
| 3,958,842 | 5/1976 | Telle ..................................... | 310/90.5 |
| 4,268,095 | 5/1981 | Millner ................................ | 310/90.5 |
| 4,483,570 | 11/1984 | Inoue ................................... | 310/90.5 |
| 5,017,819 | 5/1991 | Patt et al. ............................ | 310/90.5 |
| 5,315,197 | 5/1994 | Meeks et al. ....................... | 310/90.5 |
| 5,394,044 | 2/1995 | Yamamura .......................... | 310/90.5 |
| 5,514,924 | 5/1996 | McMullen et al. ................. | 310/90.5 |
| 5,521,448 | 5/1996 | Tecza et al. ........................ | 310/90.5 |

FOREIGN PATENT DOCUMENTS

| | | | |
|---|---|---|---|
| 284 487 | 9/1988 | European Pat. Off. . | |
| 360 654 | 3/1990 | European Pat. Off. . | |
| 445 691 | 9/1991 | European Pat. Off. . | |
| 641 061 | 3/1995 | European Pat. Off. . | |
| 2 489 449 | 3/1982 | France . | |
| 2421853 | 11/1975 | Germany ............................ | 310/90.5 |
| 43 01 076 | 7/1994 | Germany . | |
| 56-59027 | 5/1981 | Japan ................................... | 310/90.5 |
| 56-113825 | 9/1981 | Japan ................................... | 310/90.5 |
| 57-137740 | 8/1982 | Japan ................................... | 310/90.5 |
| 59-47520 | 3/1984 | Japan ................................... | 310/90.5 |
| 61-116121 | 6/1986 | Japan ................................... | 310/90.5 |

*Primary Examiner*—Clayton E. LaBalle
*Attorney, Agent, or Firm*—Evenson, McKeown, Edwards & Lenahan, PLLC

[57] ABSTRACT

A device for magnetically centering, with respect to a reference axis, a second body mobile relative to a first body includes a magnetic bearing that is active along the reference axis. It further includes two magnetic centering devices offset axially along that axis, on opposite sides of the magnetic bearing.

20 Claims, 3 Drawing Sheets

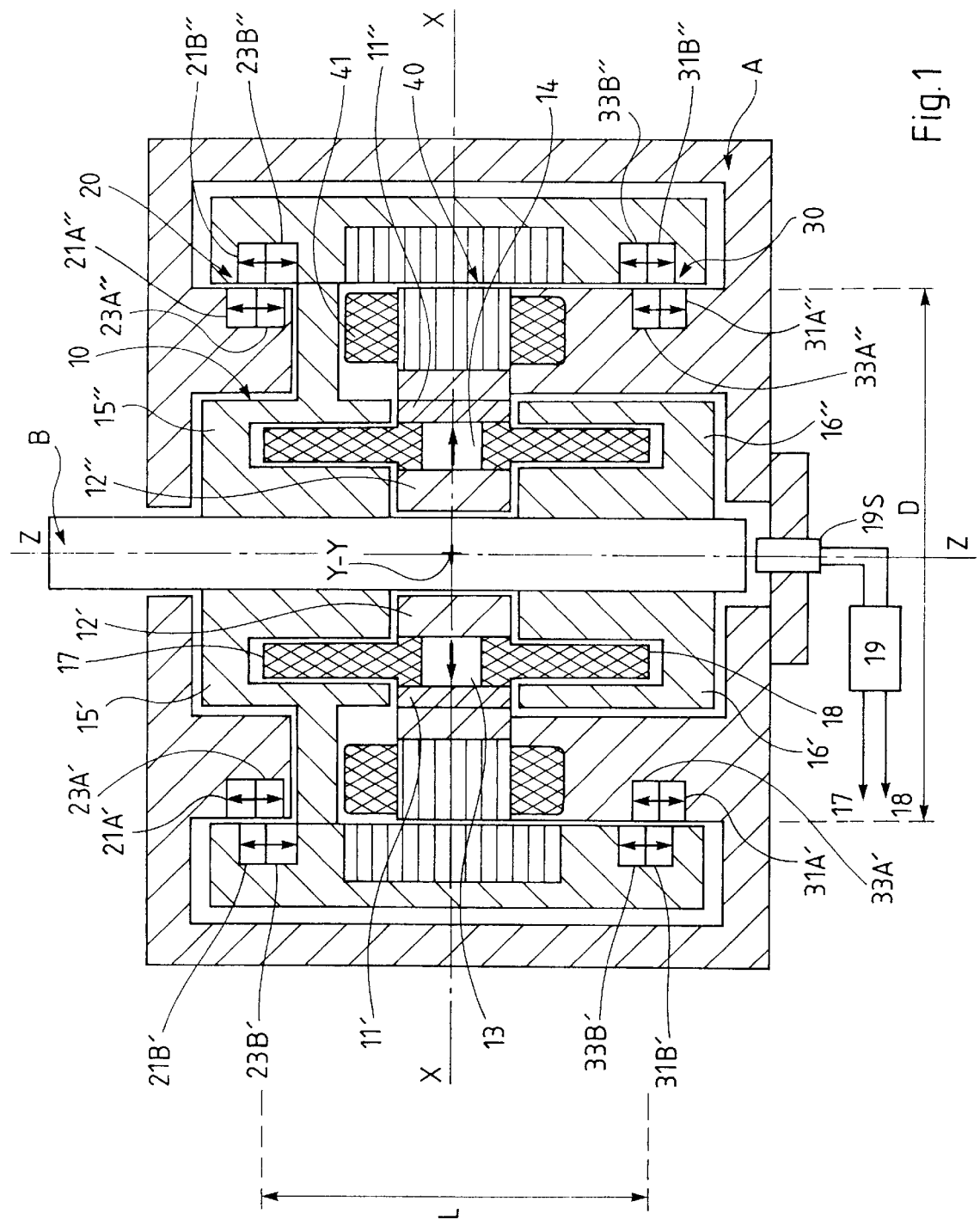

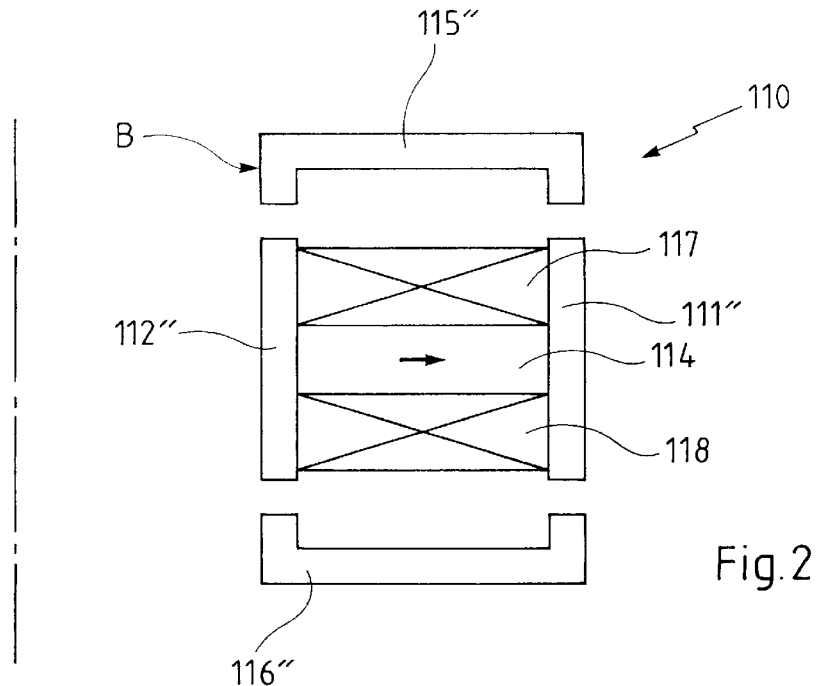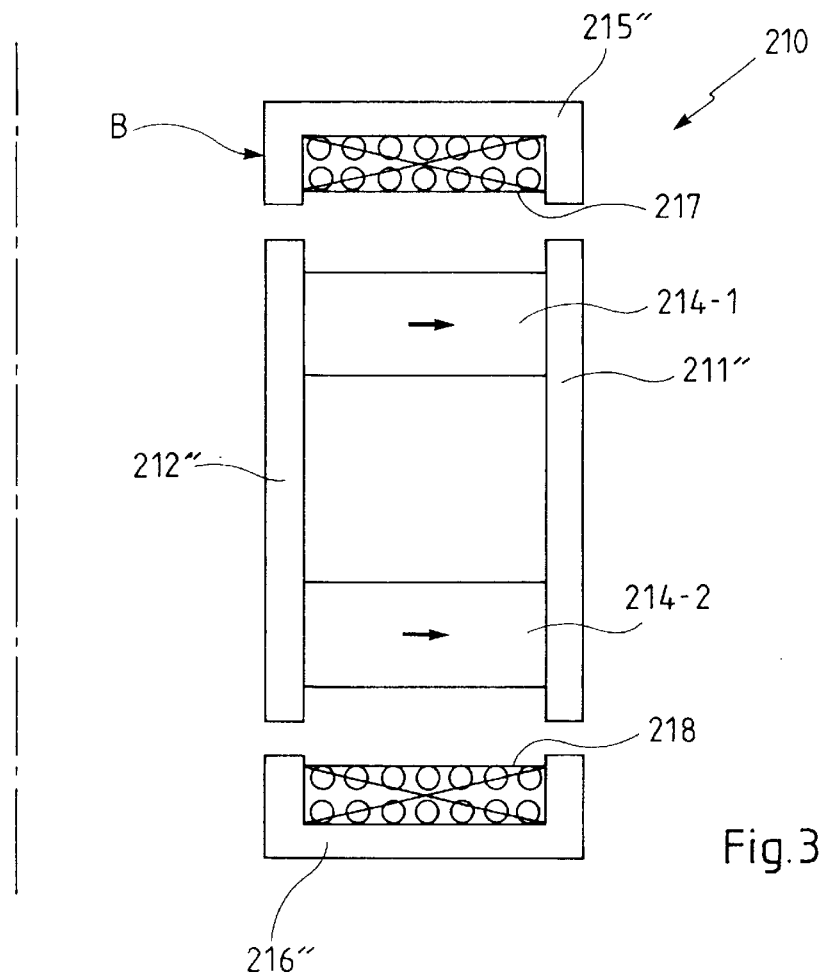

5,804,899

MINIATURE MAGNETIC BEARING WITH AT LEAST ONE ACTIVE AXIS

BACKGROUND OF THE INVENTION

1. Field of the Invention

The invention concerns a magnetic bearing with a magnetically active centering axis, combining compact overall size along this axis with good stiffness transversely to this axis and in tilting transversely to this axis.

The active centering axis is, for example, the rotation axis about which a first body or rotor turns relative to a second body or stator. However, the invention is also intended to cover the situation in which the moving body moves in translation in a direction perpendicular to the active centering axis.

2. Description of the Prior Art

One example of a magnetic bearing active about the axis of rotation of a rotor relative to a stator is described in document U.S. Pat. No. 3,955,858 (POUBEAU), for example, in which FIG. 21 shows a radially magnetized annular magnet on one of the bodies gripped between two concentric cylindrical polepieces and two annular windings on the other body disposed axially facing the magnet, on opposite sides of the latter, gripped in C-shape annular polepieces the edges of which face the edges of the cylindrical polepieces, so defining annular airgaps.

For a sufficiently great height (the distance between the two airgaps parallel to the active centering axis) relative to the mean diameter of the airgaps, a bearing of the aforementioned type is generally stable in radial displacement or tilting but unstable along the axis (it is for this reason that the magnetic centering must be active along this axis). This instability is corrected by means of control electronics feeding control current to the coils based on information on the position or the axial speed of the rotor, obtained from a sensor, for example, a sensor near ends of a central axis of the rotor.

Miniaturizing a bearing of this kind, i.e. obtaining satisfactory radial, axial and tilting stiffness within a compact overall size, nevertheless raises a problem that as yet has not been solved satisfactorily.

It is found that satisfactory radial and tilting stiffness are usually obtained with a form factor (the ratio of the length between airgaps to the mean diameter of the latter) above a threshold. Below this threshold tilting becomes unstable (which is explained by the sum of the individual torques generated near the teeth flanking the airgaps by the axial and radial stiffnesses at the location of those airgaps: this torque can increase any accidental tilting, however small).

It therefore seems to follow that reducing the height of a bearing inevitably involves reducing its diameter at the same time.

The problem is then that reducing the diameter of the bearing implies reducing the mass of the magnet, with the result that it is not strong enough to achieve good centering.

An object of the invention is to alleviate the above problems and to obtain satisfactory radial and tilting performance without it being necessary to consider the shape (and therefore the form factor) of the space available in a given application for installing the bearing, but taking full advantage of this space.

SUMMARY OF THE INVENTION

To this end the invention proposes a device for magnetically centering, about a reference axis Z—Z, a second body mobile relative to a first body, said device including:

a magnetic bearing active along the reference axis,
two magnetic centering devices offset axially, along that axis, on opposite sides of the magnetic bearing.

In accordance with preferred features of the invention, some of which may be combinable with others:

the magnetic bearing includes:
  on the first body, two pairs of ferromagnetic polepieces disposed on opposite sides of the reference axis and magnets magnetized transversely to the reference axis and gripped transversely between the ferromagnetic polepieces of said pairs,
  on the second body, two pairs of ferromagnetic polepieces disposed axially on opposite sides of the polepieces of the first body across the airgap, and
  at least one coil with turns transverse to the reference axis adapted to generate a flux through one of the polepieces, there are two coils disposed axially on opposite sides of the magnet, each coil is disposed transversely between the polepieces of the first body, each coil is disposed transversely between the polepieces of the second body, the pairs of polepieces and the magnets are rings coaxial with the reference axis, said axis being an axis of relative rotation between the two bodies, the polepieces are elongate in a translation direction perpendicular to the reference axis and perpendicular to the direction in which the magnets are disposed, the coils being wound around cores aligned parallel to the translation direction, each centering device includes at least two pairs of magnets disposed at least approximately symmetrically about the reference axis, the magnets of each pair being distributed on the two bodies so as to be facing each other, transversely to the reference axis, across airgaps and being magnetized so that said magnets repel each other across said airgaps, the two magnets of each pair have a non-null relative axial offset, the axial offset of the pairs of magnets of one centering device being in the opposite direction to the axial offset of the pairs of magnets of the other centering device, the magnets of each pair are magnetized transversely to the reference axis and in opposite directions, each centering device includes two sets each of one pair of magnets, the magnets of each pair being axially contiguous and having parallel magnetizations, the magnets of each pair are magnetized in the same direction parallel to the reference axis, each centering device includes two pairs of pairs of magnets the magnets of each pair being contiguous axially and having parallel magnetizations, each centering device is formed of two substantially concentric magnetized rings, the reference axis being an axis of relative rotation between the two bodies, each centering device is formed of two pairs of magnetized strips elongate in a translation direction perpendicular to the reference axis.

Other objects, features and advantages of the 25 invention emerge from the following description given by way of non-limiting example with reference to the appended drawings.

BRIEF DESCRIPTION OF THE DRAWINGS

FIG. 1 is a view in axial section of a magnetic centering device in accordance with the invention, in the case of a rotating body.

FIG. 2 is an axial half-section of an alternative embodiment of the magnetic bearing from FIG. 1.

FIG. 3 is an axial half-section of a further embodiment of the bearing from FIG. 1.

DESCRIPTION OF THE PREFERRED EMBODIMENTS

Figure 4:
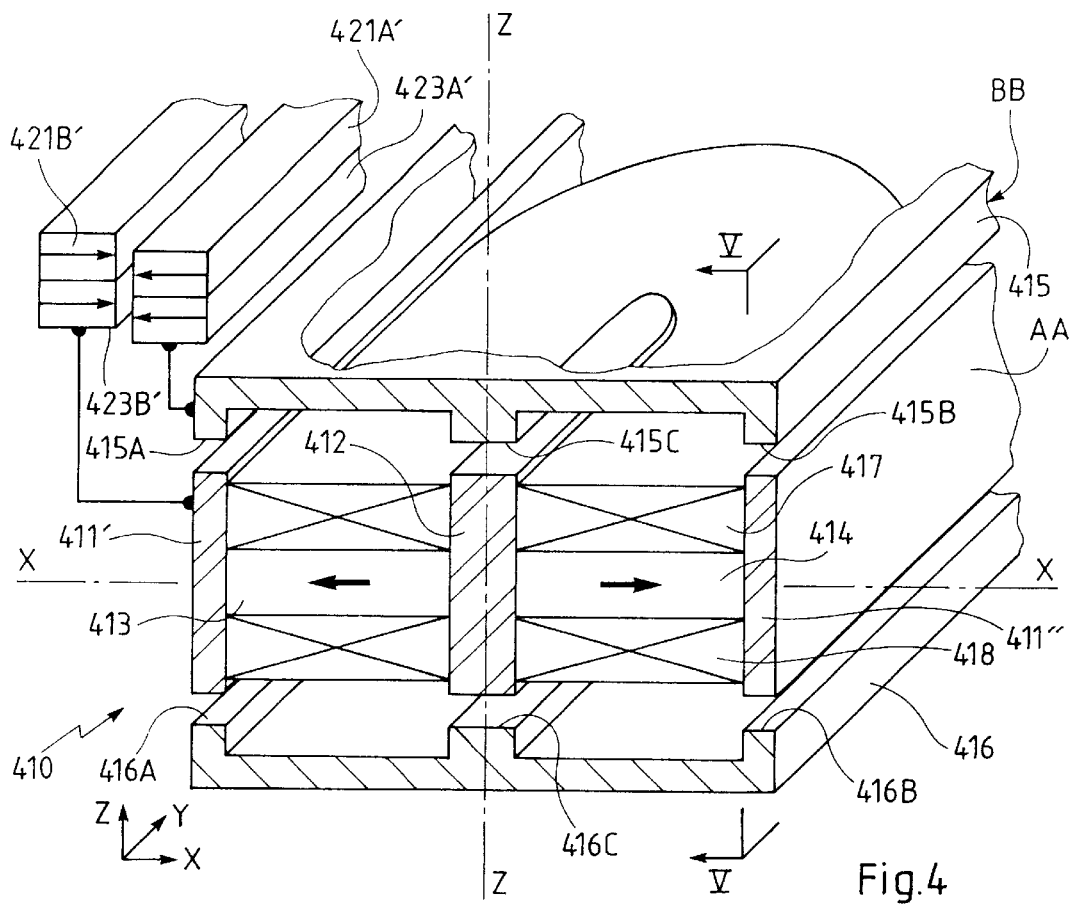
FIG. 4 is a partial perspective view of a magnetic centering device in accordance with the invention in the case of a body mobile in translation.

FIG. 1 shows a magnetic centering device adapted to procure magnetically active centering parallel to a reference axis Z—Z of a body B mobile relative to a body A, combined with passive centering along a transverse axis X—X perpendicular to the reference axis and stabilization in tilting about an axis Y—Y perpendicular to the axes X—X and Z—Z.

The device includes:

a magnetic bearing 10 having an active axis parallel to the reference axis, two magnetic centering devices 20 and 30, offset axially to either side of the magnetic bearing 10 and having a radial dimension that is advantageously greater than that of said bearing, an electromagnetic motor 40 adapted to rotate the body B relative to the body A, being in this example radially outside the bearing and axially between the centering devices.

The magnetic bearing 10 comprises:

on the body A, two pairs of ferromagnetic polepieces 11', 11" and 12', 12" disposed on opposite sides of the reference axis (11', 12' on the left, 11", 12" on the right), and magnets 13 and 14 radially magnetized in opposite directions gripped transversely between the polepieces of each pair, on the body B, two pairs of U-section ferromagnetic polepieces 15', 15" and 16', 16" disposed axially on opposite sides of the polepieces 11', 11", 12', 12", their edges facing the edges of said polepieces of the body A across the airgaps, at least one coil with its turns transverse to the reference axis Z—Z disposed transversely between the axial branches of the U-section polepieces carried by the body B and/or between the polepieces carried by the body A; there are advantageously two coils 17 and 18 disposed axially on opposite sides of the magnets 13 and 14; these coils are energized by a radial (Z—Z axis) centering control circuit 19 that is conventional in itself and is connected in a manner that is known in itself to any appropriate type of position, speed or acceleration sensor; a position sensor 19S is shown by way of example.

In the example shown, the reference axis Z—Z is an axis of relative rotation between the bodies A and B, the polepieces 11' and 11" are parts of the same radially external ring, the polepieces 12' and 12" are part of the same radially internal ring, the polepieces 15' and 15" and the polepieces 16' and 16" are respectively parts of two U-section rings, and the magnets 13 and 14 are parts of the same radially magnetized ring, the various rings being centered on the axis Z—Z. The coils are circular; as the relative movement between A and B is a rotation and the U-section rings and the coils are circular, it is no problem for these coils to be carried by the body A, entering inside the U-section rings. This arrangement has the advantage of minimizing magnetic leakage from the central magnet.

The electromagnetic motor 40 is not in itself part of the invention and will not be described in detail. It is of any appropriate type. Preferably, although this is not essential, its coils 41 are carried by the same body as the coils of the bearing 10. This body is advantageously the fixed body A, as this facilitates the electrical connections.

The two magnetic centering devices 20 and 30 have at least four pairs of magnetized portions 21A' and 21B', 21A" and 21B", 31A' and 31B', 31A" and 31B" divided between the bodies A and B (as indicated by the suffixes A and B in the reference numbers).

The magnets of each pair are, at least in part, in face-to-face relationship parallel to the axis X—X, across the airgaps, the magnets of each pair being magnetized relative to each other so that they tend to repel each other.

In the example shown the magnets of the centering devices are magnetized in the same direction parallel to the reference axis.

In an alternative embodiment (see FIG. 4) the magnets have magnetizations in opposite directions parallel to the axis X—X (although the magnetization configuration of FIG. 1 is easier to fabricate in the case of annular magnets).

The benefit of combining the bearing 10 with the centering devices 20 and 30 is that this decouples the active axial centering function of the bearing along the axis Z—Z from the passive transverse (axis X—X) and tilt (axis Y—Y) centering functions of the centering devices. It follows that the shape conditions mentioned above (ratio between length (or separation) and diameter) do not have to be complied with by the bearing itself, but merely by the combination of the two centering devices: it then becomes possible to determine the dimensions of the bearing in accordance only with available space constraints and the required performance of the active axial centering function. As the centering devices can have a small cross-section, they can easily be disposed radially and axially at the periphery of the device, allowing full advantage to be taken of the space available for the device from the point of view of the ratio between the length and the diameter (mean axial separation L and diameter D of the airgaps of the centering devices), combined with the facility for various components of the device to be installed between them.

An axial offset is preferably introduced between the magnets of each pair 21A' and 21B', 21" and 21B", etc; the axial offsets between the four pairs of magnets are in the same direction on either side of the reference axis Z—Z and in opposite directions on either side of the transverse axis X—X.

In the example shown it is the magnets farthest from Z—Z that are nearest X—X. In alternative embodiments, not shown, the offsets are in the opposite sense and the magnetization directions can be reversed within the same pair.

For a given form factor L/D, such offsets increase tilting stiffness, possibly to the detriment of transverse stiffness about the axis X—X.

It is also advantageous (even in the absence of any axial offset) to duplicate the centering devices and thereby increase the various stiffnesses.

Accordingly, as shown in FIG. 1, another magnetized portion is attached axially to each magnetized portion (23A' in the case of the magnet 21A', 23B' in the case of the magnet 21B', 23A" in the case of the magnet 21A", and so on, up to 33A' for the magnet 31A', etc).

Since FIG. 1 corresponds to the situation in which the axis Z—Z is a rotation axis, the magnetized portions constituting the airgaps are advantageously parts of rings 21A, 21B, 23A, 23B; 31B, 33A, 33B.

It is clear that in FIG. 1, in which various components are circular, there is passive transverse and tilt centering along each of the axes X—X and Y—Y.

The bearing is 30 mm in diameter and 32 mm high, for example, and Kr denotes the radial stiffness and Kb the tilt stiffness (they are positive if the centered position is a position of stable equilibrium, or negative otherwise). The following cases have to be considered:

1—Bearing with no centering device

Kr=15 N/mm

Kb=10 Nm/rad

2—Bearing with two simple centering devices with no offsets, the centering devices each being formed by two magnetized rings of 3 mm×3 mm section:

Outside diameter of inside magnet: 36 mm

Inside diameter of outside magnet: 36.6 mm

Mean axial spacing between airgaps: 37 mm

L/D=1.1

Kr=60 N/mm

Kb=2 Nm/rad

3—Bearing with two simple centering devices with offset (with the same magnets as in case 2)

Axial offset between magnets of each centering device: 0.6 mm

Mean axial spacing between airgaps: 21.7 mm

L/D=0.68

Kr=40 N/mm

Kb=10 Nm/rad

4—Bearing with two duplicated centering devices with offset (with individual magnets the same diameter as in cases 2 and 3 but with an axial dimension of only 2 mm (width 3 mm)

Axial offset (for each individual centering device): 0.6 mm

Axial spacing between airgaps: 21.7 mm

L/D=0.76

Kr=82N/mm

Kb=11.5 Nm/rad

This produces a complete configuration made up of a central bearing and a set of centering devices. Given the intended overall size, the central bearing is so small that its radial and tilt stiffness are very low compared to those of the centering devices (Kr=15 N/mm, in case 1, compared with Kr=82 N/mm; likewise in the tilt direction), whence the idea of reducing the height of the central bearing, to the detriment of its L/D ratio. The function of the bearing is thereby reduced to that of an actuator for compensating its own axial stability and that of the centering devices. The central bearing can even have virtually zero radial stiffness and be unstable in tilting, provided that the positive stiffness of the centering devices remains greater than that of the bearing.

A system has been constructed, within these extremely small overall dimensions (outside diameter: 45 mm, total height: 32 mm), comprising a magnetic bearing of acceptable stiffness, stable about all the passive axes, that could not have been constructed either with a set of centering devices only or with a single axis type bearing.

Moreover, each of the two components (centering device and bearing) was optimized (axial offsets in the case of the centering devices, length in the case of the bearing) to reduce the total overall size, allowing for the strengths of each. This resulted in a symbiosis between the two concepts, achieving a result that could not be obtained with either of the two components on its own.

Note that since the radial centering is provided by the centering devices, the polepieces 15', 15", 16' and 16" do not need to be of U-section; they can therefore be in the form of simple washers (provided that the width of the airgaps remains reasonable, for example by increasing the height of the polepieces 11', 12', 11" and 12").

FIG. 2 shows a different embodiment of the bearing 10 from FIG. 1, denoted overall by the general reference number 110, and component parts of which similar to those of the bearing 10 are denoted by the same reference numbers increased by 100. This bearing differs from the bearing 10 in that the coils 117 and 118 are engaged transversely between the polepieces 111" and 112" which grip the magnet. A configuration of this kind is particularly well suited to the case in which (see FIG. 4) the mobile member B moves in translation along the axis Y—Y in FIG. 1.

FIG. 3 shows another embodiment of the bearing 10 from FIG. 1, denoted overall by the general reference number 210, and component parts of which similar to those of the bearing 10 are denoted by the same reference numbers increased by 200. This bearing is different from the bearing 10 in that the magnet is duplicated to produce two magnets 214-1 and 214-2 and the coils are connected to the other body B. In this way the functions of the rotor and the stator can be interchanged.

FIG. 4 shows a bearing designed to guide movement of a body BB in translation relative to a body AA.

According to a feature of the invention that is novel in itself, the bearing 410 has an active axis Z—Z that is perpendicular to the translation direction Y—Y, with coils 417 and 418 that have turns perpendicular to the axis Z—Z and that are axially disposed on opposite sides of the magnetized strips 413 and 414, being wound on at least one central ferromagnetic member 412 forming a ferromagnetic core, and having two ferromagnetic members 411' and 411" running alongside them, parallel to the central member 412, to the axis Z—Z and to the translation direction.

The body BB includes two polepieces 415 and 416 having rims (three rims 415A, 415B and 415C in this embodiment) parallel to the direction Y—Y and facing the edges of the members 411', 411" and 412 across the airgaps.

The cores 412 can be attached to the body AA by the magnets 413 and 414 gripped between the cores and the lateral polepieces 411' and 411".

Figure 5:
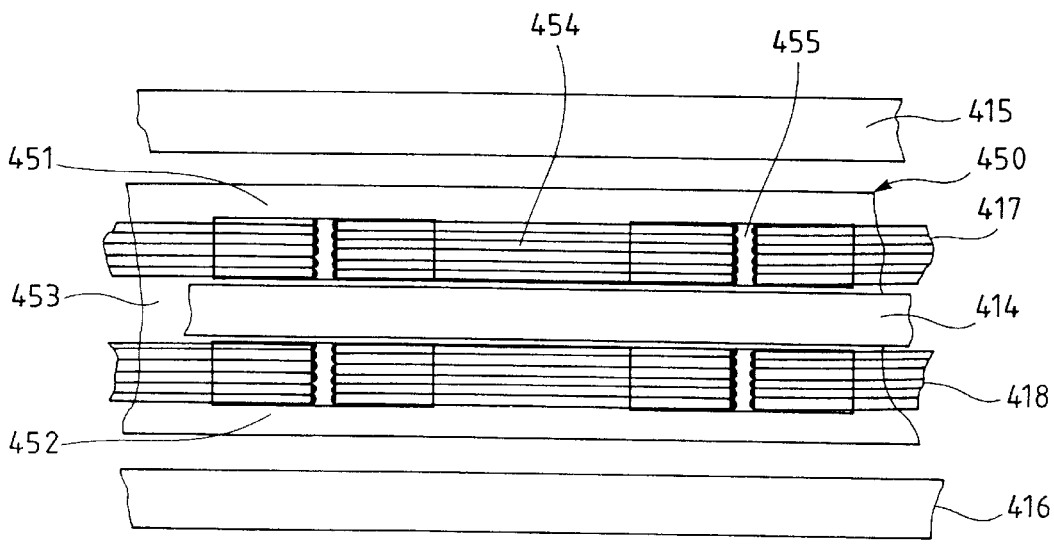
FIG. 5 is a part-sectional view of this device on the section plane V—V in FIG. 4.

In an alternative embodiment shown in FIG. 5, rather than being separate the cores are formed in a continuous member 450 having, between continuous high and low portions 451, 452 on opposite sides of a continuous central portion 453, a two-fold alternation of solid and hollow portions 454, 455, the coils 417 and 418 being formed around the solid portions and passing across the hollow portions. This increases the mechanical strength of the various cores and minimizes flux variations due to displacement.

The configuration of a bearing 410 of this kind has the advantage that it can be more compact for comparable performance than a translation guidance bearing with active centering parallel to the plane of the turns (cf. EP-A-0 284 487, for example), in practise using coils that are not stacked, as here, but instead offset parallel to the plane of their turns, resulting in a dimension along X—X very much greater than that along Y—Y (or vice versa).

The rims 415A . . . and 416A . . . provide passive guidance along X—X. If they are dispensed with, displacement is allowed along Y—Y as well as along X—X.

As in FIG. 1, the bearing 410 in FIG. 4 is combined with coupling devices formed of four pairs of magnets, preferably duplicated magnets (only the duplicated pair of magnets 421B'+423B' facing 421A'+423A' is shown), except that the magnets are no longer parts of rings, but instead in the form of elongate strips parallel to the translation direction. As previously, the magnets of each pair advantageously have an offset 1 along Z—Z.

The construction of the bearing 410 can of course be varied in a number of ways, for example by analogy with the half-bearing from FIG. 3.

It goes without saying that the foregoing description has been given by way of non-limiting example only and that the person skilled in the art will be able to conceive of numerous variants without departing from the scope of the invention.

There is claimed:

1. Device for magnetically centering, about a reference axis, a second body mobile relative to a first body, said device including:

a magnetic bearing active along said reference axis, and two magnetic centering devices offset axially along said reference axis and transversely disposed outside said magnetic bearing.

2. Device according to claim 1 wherein said magnetic bearing includes:

two pairs of ferromagnetic polepieces on said first body disposed on opposite sides of said reference axis and magnets magnetized transversely to said reference axis and gripped transversely between said ferromagnetic polepieces, two pairs of ferromagnetic polepieces on said second body disposed axially on opposite sides of said polepieces of said first body across an airgap, and at least one coil with turns transverse to said reference axis adapted to[]generate a flux through one of said polepieces.

3. Device according to claim 2 comprising two coils disposed axially on opposite sides of said magnets.

4. Device according to claim 2 wherein each coil is disposed transversely between said polepieces of said first body.

5. Device according to claim 2 wherein each coil is disposed transversely between said polepieces of said second body.

6. Device according to claim 2 wherein said pairs of polepieces and said magnets are rings coaxial with said reference axis, said axis being an axis of relative rotation between said two bodies.

7. Device according to claim 2 wherein said polepieces are elongate in a translation direction perpendicular to said reference axis and perpendicular to the direction in which said magnets are disposed, each coil being wound around cores aligned parallel to said translation direction.

8. Device according to claim 1 wherein said centering device includes at least two pairs of magnets disposed at least approximately symmetrically about said reference axis, said magnets of each pair being distributed on said two bodies so as to be facing each other, transversely to the reference axis, across airgaps and being magnetized so that said magnets repel each other across said airgaps.

9. Device according to claim 8 wherein said two magnets of each pair have a non-null relative axial offset, said axial offset of said pairs of magnets of one centering device being in the opposite direction to said axial offset of said pairs of magnets of the other centering device.

10. Device according to claim 8 wherein said magnets of each pair are magnetized transversely to said reference axis and in opposite directions.

11. Device according to claim 10 wherein each centering device includes two sets each of one pair of magnets, said magnets of each pair being axially contiguous and having parallel magnetizations.

12. Device according to claim 8 wherein said magnets of each pair are magnetized in the same direction parallel to said reference axis.

13. Device according to claim 12 wherein each centering device includes two sets each of one pair of magnets, the magnets of each pair being contiguous axially and having parallel magnetizations.

14. Device according to claim 8 wherein each centering device is formed of two substantially concentric magnetized rings, said reference axis being an axis of relative rotation between said two bodies.

15. Device according to claim 8 wherein each centering device is formed of two pairs of magnetized strips elongate in a translation direction perpendicular to said reference axis.

16. Device according to claim 8 wherein each magnet of each pair of each centering device is formed of two individual magnets.

17. Device according to claim 16 wherein the individual magnets in each magnet have opposite magnetization directions.

18. Device according to claim 2, wherein said centering devices are disposed axially and transversely near a periphery of said pairs of ferromagnetic polepieces of said second body.

19. A magnetic device comprising:

a first body, a second body, said first body and said second body being mobile relative to each other about a reference axis, two magnetic centering devices offset axially along said reference axis for at least transversely centering said first and second bodies relative to each other, said magnetic centering devices having a transverse dimension and an axial distance which is at most substantially equal to said transverse dimension, and a magnetic bearing for centering said first body and said second body relative to each other along said reference axis, said magnetic bearing being substantially disposed between said magnetic centering devices.

20. A device according to claim 19, wherein said axial distance is not more than 1.1 times said transverse dimension.

* * * * *